United States Patent
Mollard

(10) Patent No.: US 6,725,875 B2
(45) Date of Patent: Apr. 27, 2004

(54) VALVE

(75) Inventor: Pascal Mollard, Aix les Bains (FR)

(73) Assignee: ABB Cellier S.A., Aix les Bains (FR)

( * ) Notice: Subject to any disclaimer, the term of this patent is extended or adjusted under 35 U.S.C. 154(b) by 0 days.

(21) Appl. No.: 10/091,902

(22) Filed: Mar. 6, 2002

(65) Prior Publication Data

US 2002/0124884 A1 Sep. 12, 2002

(30) Foreign Application Priority Data

Mar. 8, 2001 (FR) .............................. 01 03177

(51) Int. Cl.$^7$ ........................... B08B 9/055; B08B 9/032
(52) U.S. Cl. ............. 137/244; 15/104.062; 134/166 C; 137/240; 137/625.17; 137/862
(58) Field of Search ................. 137/242, 239, 137/244, 245, 268, 238, 240, 625.17, 862; 15/104.06, 104.062

(56) References Cited

U.S. PATENT DOCUMENTS

| | | | |
|---|---|---|---|
| 2,305,724 A | * 12/1942 | Luetzelschwab | ............. 137/240 |
| 2,917,069 A | * 12/1959 | Lundy et al. | ................ 137/240 |
| 2,930,395 A | * 3/1960 | Eddy et al. | .................. 137/240 |
| 3,063,079 A | 11/1962 | Bergman et al. | .......... 15/104.06 |
| 3,068,901 A | 12/1962 | Anderson | ............... 137/625.48 |
| 3,133,554 A | * 5/1964 | Joebken | ....................... 137/240 |
| 3,146,477 A | * 9/1964 | Bergman et al. | ........ 15/104.062 |
| 4,249,560 A | * 2/1981 | Raque et al. | ................ 137/240 |
| 4,375,821 A | * 3/1983 | Nanao | ......................... 137/239 |
| 5,035,256 A | * 7/1991 | Le Devehat | ................. 137/242 |
| 5,113,895 A | 5/1992 | Le Devehat | ................. 137/244 |
| 5,193,572 A | 3/1993 | Le Devehat | ................. 137/244 |
| 5,881,761 A | * 3/1999 | Coendoz | ...................... 137/268 |

* cited by examiner

Primary Examiner—George L. Walton
(74) Attorney, Agent, or Firm—Heslin Bothenberg Farley & Mesiti P.C.

(57) ABSTRACT

A directional-control valve is connectable to a first main pipe and to a secondary pipe. The valve includes an upstream port and a downstream port connectable to the first main pipe and having identical diameters. A third connection port is connectable to the secondary pipe. A shut-off member is capable of moving at right angles to the main pipe between a closed position and a second open position. In the closed position, the shut-off member includes a first orifice, of a diameter identical to that of the upstream port and downstream port, positioned in line with the upstream port and the downstream port. In the second open position, the shut-off member includes a second orifice opening toward the upstream port and toward the third connection port, so as to place the upstream port and the secondary pipe in communication, and wherein the diameter of the upstream port and the downstream port is sized to allow a scraper to pass, and the second orifice of the shut-off member includes means for preventing the scraper, coming from the upstream port, from entering the second orifice.

7 Claims, 3 Drawing Sheets

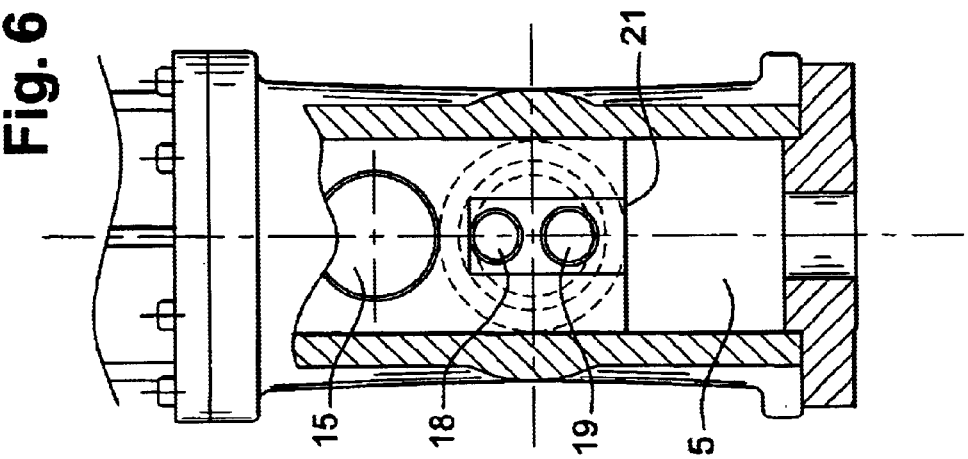
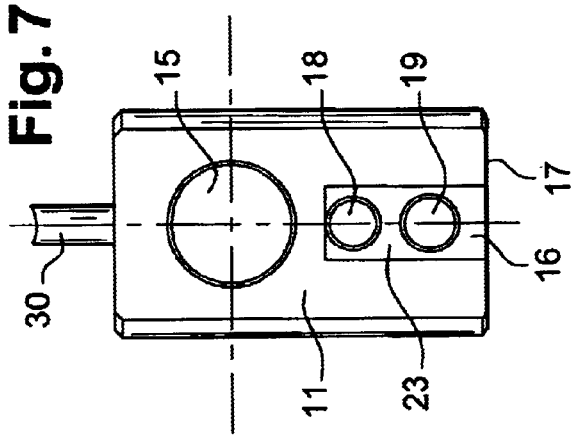
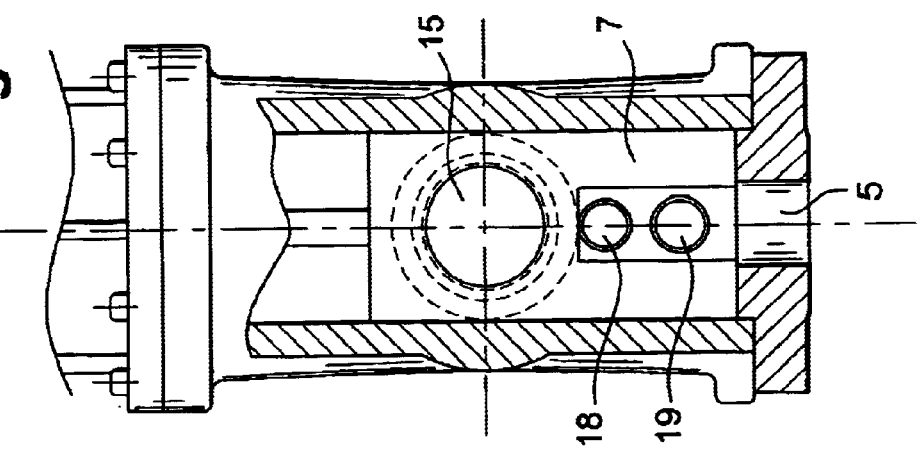

VALVE

CROSS-REFERENCE TO RELATED APPLICATIONS

This application is a continuation of copending French application FR 01.03177, filed Mar. 8, 2001. The priority of this application is claimed herein, and the entire disclosure of this application is incorporated herein by reference.

1. Technical Field

The invention relates to the field of valves used in plant involving the distribution of fluids. It finds a particular application especially in chemical plants which mix various products, such as is the case, for example, in the lubricant industry, the paint industry, or in papermaking plant. It relates more specifically to a directional-control valve which allows two pipes to be connected, and which at the same time has sealing properties while being compatible with cleaning by passing a scraper through.

2. Prior Art

In general, plant involving the distribution of liquid products comprises several pipes or lines inside which the product or products distributed flow. Depending on the various destinations of the products, it may be necessary to connect certain pipes with certain others using valves. The directional-control valves therefore allow a first pipe to be connected to a second.

Thus, in general, these valves are intended to connect a first pipe known as a "main pipe" to a second pipe known as a "secondary pipe" which is generally at right angles to it. Where the main pipe and the secondary pipe meet, the valve has a moving member which, depending on the position it occupies, either connects or does not connect the main pipe and the secondary pipe. An example of a valve such as this is described in document U.S. Pat. No. 3,068,901.

When the plant conveys different products, it may be important to guard against the risk of contamination of one product with traces of a product which passed down a pipe previously. This is why certain pipes need to be cleaned after a first fluid has passed. To facilitate these cleaning operations, and in particular to automate them, it is known practice to use scrapers which are elements which have an outside diameter roughly equal to the inside diameter of the pipes in which they run. These scrapers, as they move, carry along the traces of the liquid or fluid which remain in the pipe. An example of the use of a scraper in a valve is given in document U.S. Pat. No. 3,063,079.

A first problem that the invention sets out to solve is therefore that of providing a valve which is compatible with the passage of a cleaning scraper.

In order to place various pipes in communication using directional-control valves, several solutions have already been proposed.

Thus, one known solution involves plug valves in which the moving member situated in the valve is able to move at right angles to the main pipe. This moving member has a portion forming a through-orifice which has a diameter identical to that of the main pipe. Thus, a scraper running down the main pipe can pass through this orifice. When the moving member is moved, it occupies a position in which it is situated partly in the middle of the main pipe, thus opening the passage between the main pipe and the secondary pipe. This kind of valve therefore has the advantage of preventing the scraper from running through when the valve is open, that is to say when fluid can circulate from the main pipe to the secondary pipe.

By contrast, this type of valve has the major disadvantage of not providing sealing between the upstream port and the downstream port of the main pipe when the valve is open.

A first problem that the invention sets out to solve is that of providing sealing between the upstream port and the downstream port of the main pipe when the valve is open.

Another known type of directional-control valve is the valve commonly known as a ball valve. In this kind of valve, the moving member is a sphere, which is pierced with a through-orifice intended to place the ports of the valve on each side of this orifice in communication. Examples of this type of valve are described in documents U.S. Pat. No. 5,113,895 and EP 0 563 853.

Such a valve has the major disadvantage of being mechanically complex, because it entails precise machining of the spherical moving element, which greatly increases the cost price of such a valve.

There are also known other directional-control valves generally known as butterfly valves, such as the one described in particular in document U.S. Pat. No. 5,193,572. The moving member of such a valve shuts off the passage between the main pipe and the secondary pipe. As it moves, the moving member partially enters the main pipe, and in this position forms an obstacle to the scraper, thus preventing the latter from traveling unintendedly into the plant. This type of valve also has the major disadvantage of maintaining a connection between the upstream port and the downstream port of the main pipe in both positions of the moving member.

The objective of the invention is to provide a valve which allows a scraper to pass along the main pipe, while at the same time providing optimum sealing between the main pipe and the secondary pipe when necessary, or alternatively sealing between the upstream port and the downstream port of the main pipe.

SUMMARY OF THE INVENTION

The invention therefore relates to a directional-control valve intended to connect a first pipe known as a main pipe and a second pipe known as a secondary pipe. This valve comprises, in the known way, an upstream port and a downstream port which are connected to the main pipe and have identical diameters, and a third connection port connected to the secondary pipe.

This valve also comprises a shut-off member capable of moving at right angles to the main pipe, between two positions, namely:

a first position, known as a closed position, in which the shut-off member has a first orifice, of a diameter identical to that of the upstream port and downstream port, positioned in line with said upstream port and downstream port, so as to allow fluid to pass through the main pipe;

a second position known as the open position, in which the shut-off member has a second orifice opening, on the one hand, toward the upstream port and, on the other hand, toward the third connection port, so as to place the upstream port and the secondary pipe in communication.

According to the invention, this valve is one wherein the diameter of the upstream port and the downstream port is chosen to allow a scraper to pass, and the second orifice of the shut-off member has means for preventing the scraper, coming from the upstream port, from entering the second orifice of the shut-off member.

In other words, the shut-off member has a through-orifice, the inside diameter of which corresponds to that of the main pipe. When this through-orifice faces the upstream port and the downstream port, the continuity of the main pipe is ensured with a constant diameter over the entire passage through the valve. The scraper can therefore pass, and this scraper can act effectively along the entire length of the main pipe, particularly in the region of the valve.

When the shut-off member moves, the communication between the downstream port and the secondary pipe is cut off, and the communication between the upstream port and the secondary pipe is established, and this allows the fluid to flow from the main pipe into the secondary pipe. In this configuration, the scraper is stopped in its progression inside the upstream port so that it does not impede the movement of the shut-off member when the valve switches from the open position to the closed position.

Advantageously in practice, the valve comprises sealing means arranged both between the upstream port and the shut-off member, and between the downstream port and the shut-off member. These sealing means provide sealing between the primary and secondary pipes in both positions of the shut-off member.

In other words, when the valve is closed, sealing between the main pipe and the secondary pipe is provided so that no fluid can pass from the main pipe to the secondary pipe. When the valve is in the open position, sealing is provided between the downstream port and the upstream port and the third connection port connected to it. Thus, fluid coming from the main pipe from the upstream port is routed in its entirety into the secondary pipe without any risk of it continuing on its way in the main pipe via the downstream port.

Advantageously in practice, the shut-off member has two flat faces in these regions facing the upstream port and the downstream port. Thus, the sealing means arranged between the upstream port and the downstream port, and the shut-off member are of planar geometry, therefore of conventional design. They are also easier to arrange.

In a preferred embodiment, these sealing means may consist of O-rings, the centers of which lie on the axis of the main port.

Advantageously in practice, the valve according to the invention may comprise at least one rinsing nozzle located in the third connection port and able to shower the region where the third port and the main pipe meet. Thus, it is possible to clean the region of the valve which is not accessible to the scraper, and it is possible in this way to avoid any risk of contamination or pollution of successive products passed through the characteristic valve.

In a preferred embodiment, one of these rinsing nozzles may be directed into the position that the scraper occupies when the latter comes into contact with the means preventing it from entering the second orifice of the shut-off member. Thus, it becomes possible to clean not only the body of the valve and the shut-off member, but also the scraper which comes into contact with this shut-off member when the valve is open.

In practice, the shut-off member may be moved by a great many actuators isolated from the body of the valve such as, for example, manual actuators or pneumatic rams or alternatively electrical devices.

BRIEF DESCRIPTION OF THE FIGURES

The way in which the invention is embodied and the advantages which ensue therefrom will become clearly apparent from the description of the embodiment which follows, supported by the appended figures in which:

FIG. 3 is a view in section on III–III' of FIG. 1.

FIG. 6 is a view in section on VI–VI' of FIG. 4.

FIG. 7 is a view on III–III' of FIG. 1, showing the shut-off member alone.

EMBODIMENT OF THE INVENTION

As already mentioned, the invention relates to a directional-control valve that can be cleaned by passing a scraper, and which has excellent sealing properties in its various positions.

Figure 1:
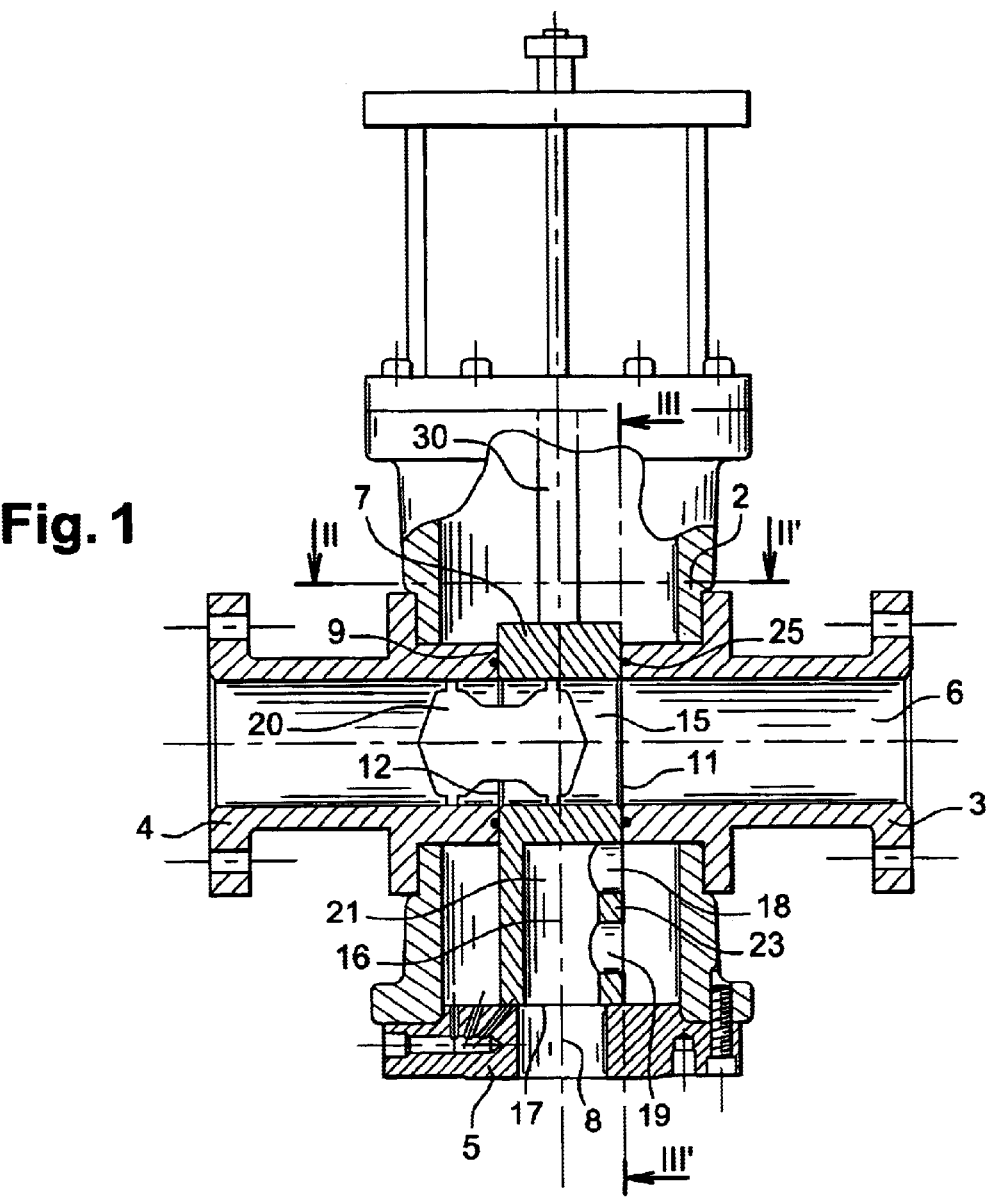
FIG. 1 is a view in cross section of a valve according to the invention, shown in its closed position.
Figure 2:
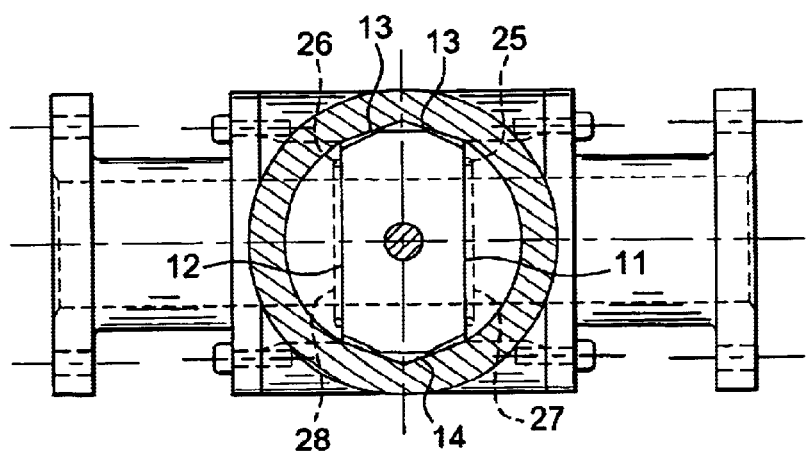
FIG. 2 is a view in section on II–II' of FIG. 1.

Precisely, and as illustrated in FIG. 1, such a valve (1) comprises a valve body (2), and various connection ports. More specifically, the valve (1) comprises an upstream port (3) and a downstream port (4) which lie one in the continuation of the other, and is intended to be connected to a main pipe, not depicted. The fluid flowing through the main pipe flows from the upstream port (3) to the downstream port (4). The valve (1) also comprises a third connection port (5) intended to be connected to a secondary pipe, not depicted. The third connection port (5) is arranged at right angles to the axis (6) of the main pipe.

According to one feature of the invention, the valve (1) also comprises a moving shut-off member (7) able to move at right angles to the main pipe, and in the direction (8) of the secondary pipe. This shut-off member (7) is mounted to slide inside a housing (9) provided for that purpose between the upstream port and the downstream port.

In its form illustrated in FIG. 1, the faces (11, 12) of the shut-off member (7) which face toward the upstream port (3) and the downstream port (4) are flat. The lateral faces (13, 14) connecting these flat faces (11, 12) are cylindrical, and of a diameter roughly equal to the inside diameter of the third connection port (5), to within mechanical clearances.

According to the invention, the shut-off member (7) has two distinct through-orifices (15, 16). The first orifice (15) situated in the upper part of the shut-off member (7) has a cylindrical profile, of a diameter equal to that of the upstream port (3) and downstream port (4) of the main pipe. Thus, and as illustrated in FIG. 1, when the valve is in its "closed" position, the main pipe has a constant diameter through the valve, allowing a cleaning scraper (20) to pass.

Figure 4:
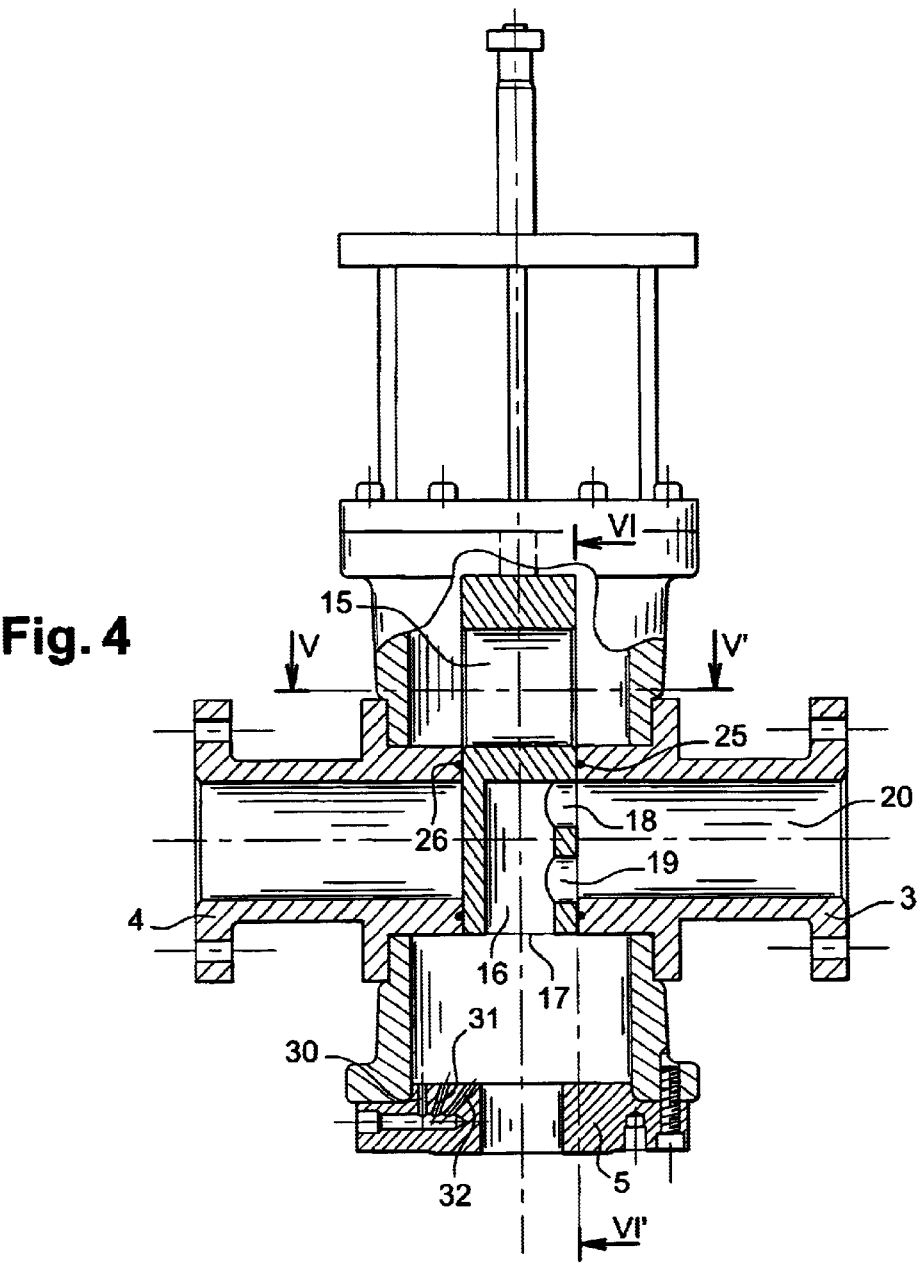
FIG. 4 is a cross section of a valve according to the invention, shown in its open position.
Figure 5:
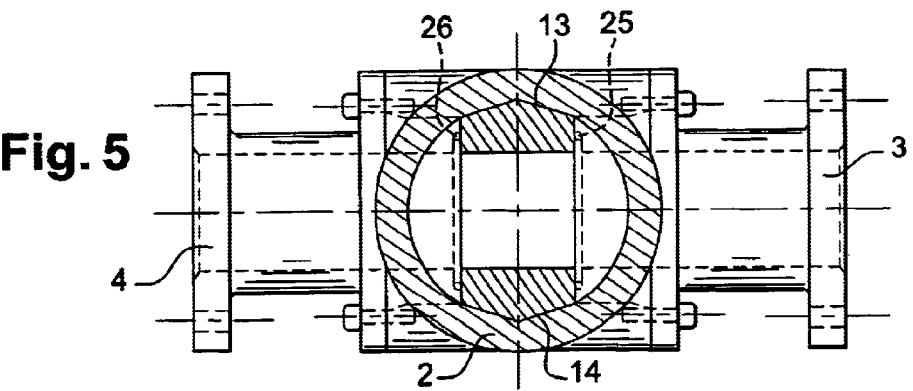
FIG. 5 is a view in section on V–V' of FIG. 4.

The shut-off member (7) also has a second through-orifice (16) situated in the lower part. This second orifice (16) opens into the lower part (17) of the shut-off member toward the third connection port (5). This orifice also opens to the same side as the upstream port (3). For that purpose, it has two drilled holes (18, 19) in the flat face (11) of the shut-off member, these holes (18, 19) opening into a cavity (21) in communication with the outlet (17) of the orifice. The presence of the through-holes (18, 19) makes it possible to define a flush portion (23) on the surface (11) facing the upstream port (3). As illustrated in FIG. 4, this portion (23) stops the scraper (20) which lies in the upstream port (3), preventing it from entering the second orifice (16).

The valve (2) according to the invention is not restricted to this single geometry using two through-holes for entering the second orifice but also covers all alternative forms in which the face of the shut-off member facing the upstream port has a portion that halts the progress of the scraper.

According to the invention, the ends of the upstream port (3) and downstream port (4) that face the shut-off member (7) are equipped with sealing means (25, 26). More specifically, the ends of the upstream port and downstream port have a cylindrical housing (27, 28) into which an O-ring (25, 26) is fitted. Of course, the invention is not restricted to this single form of O-ring, but covers other alternative forms which allow sealing to be provided between the shut-off member and the upstream port and downstream port, it being possible for these seals to be a polytetrafluoroethylene seat, an inflatable gasket or the like.

The shut-off member (7) may be moved by various means. In the embodiment illustrated in FIGS. 1 and 3, the shut-off member (7) is connected by a spindle (30) to an arm which can be connected to various actuating mechanisms. These may be hydraulic or pneumatic rams. They may be electrical actuators or alternatively manual actuation.

In operation, when the shut-off member (7) is in the lowered position, corresponding to the valve being in a closed position, as illustrated in FIG. 1, the first orifice (15) of the shut-off member (7) is aligned with the upstream port (3) and downstream port (4) so that the fluid and a scraper (20) can travel along inside the main pipe.

Sealing between the main port and the secondary port is afforded by the two O-rings (25, 26) which prevent any ingress of fluid toward the third connection port (5).

When the shut-off member (7) is moved, it finds itself in the position illustrated in FIG. 4. The first orifice (15) is concealed inside the body (2) of the valve. The second orifice (16) then places the upstream port (3) and the third connection port (5) in communication via the through-holes (18, 19). In this case, the O-ring (26) situated between the shut-off member (7) and the downstream port (4) provides sealing between the upstream part of the main pipe and the down stream part of the main pipe.

The O-ring situated between the upstream port (3) and the shut-off member (7) prevents leaks to the outside, particularly in the upper part of the body (2) of the valve. As already mentioned, the presence of the central portion (18) of the shut-off member (7) stops the progress of the scraper (20) and therefore prevents the latter from entering the second orifice (16), thus eliminating the risk of the scraper (20) opposing the movements of the shut-off member (7).

According to another feature of the invention, the third connection port (5) is equipped with various cleaning nozzles (30–32). These nozzles are fed by an external pipeline, not depicted. Two of these nozzles (30, 32) are oriented in such a way as to shower the inside of the body of the third port (5). The central nozzle (31) is directed in such a way that it allows the second orifice (16) of the shut-off member (7) to be showered. Its orientation also allows the cleaning jet (18) to pass through one of the through-holes of the second orifice (16) so as to clean the front part of the scraper (20).

It is evident from the foregoing that the valve according to the invention has numerous advantages, particularly that of providing optimum sealing between the main port and the secondary port, while at the same time allowing a cleaning scraper to pass.

What is claimed is:

1. A directional-control valve connectable to a first main pipe and a secondary pipe the first main pipe connected to a fluid a source the valve comprising:

an upstream port and a downstream port connectable to the main pipe and having identical diameters;

a third connection port connectable to the secondary pipe;

a shut-off member capable of moving at right angles to the main pipe between, a first closed position, in which the shut-off member comprises a first orifice, of a diameter identical to that of the upstream port and downstream port, positioned in line with the upstream port and downstream port, so as to allow fluid to pass through the main pipe and inhibit fluid from passing from the main pipe to the secondary pipe, and a second open position, in which the shut-off member comprises a second orifice opening toward the upstream port and toward the third connection port, so as to place the upstream port and the secondary pipe in fluid communication and inhibit fluid from passing to the downstream port; and wherein the diameter of the upstream port and the downstream port are sized to allow a scraper to pass there through to permit cleaning there between when the shut-off member is in the first closed position and the second orifice of the shut-off member comprises means for preventing the scraper, coming from the upstream port, from entering the second orifice when the shut-off member is in the second open position.

2. The valve of claim 1 further comprising sealing means arranged between the upstream port and the shut-off member, and between the downstream port and the shut-off member, to provide sealing between the main and secondary pipes in both positions of the shut-off member.

3. The valve of claim 1 wherein the shut-off member comprises two flat faces in the regions facing the upstream port and the downstream port.

4. The valve of claim 2 wherein the sealing means comprise O-rings.

5. The valve of claim 1 further comprising at least one rinsing nozzle located in the third connection port and able to shower the region where the third port and the main pipe meet.

6. The valve of claim 5 wherein one of the nozzles is directed into the position that the scraper occupies when the scraper comes into contact with the means preventing it from entering the second orifice.

7. The valve of claim 1 wherein the shut-off member is moved by an actuator isolated from the body of the valve.

* * * * *